United States Patent
Shikata (10) Patent No.: US 9,433,860 B2
(45) Date of Patent: Sep. 6, 2016

(54) GAME SYSTEM, GAME PROCESSING METHOD, COMPUTER-READABLE STORAGE MEDIUM HAVING STORED THEREIN GAME PROGRAM, AND GAME APPARATUS

(71) Applicant: NINTENDO CO., LTD., Kyoto (JP)

(72) Inventor: Hiromasa Shikata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 632 days.

(21) Appl. No.: 13/651,940

(22) Filed: Oct. 15, 2012

(65) Prior Publication Data

US 2013/0288789 A1 Oct. 31, 2013

(30) Foreign Application Priority Data

Apr. 26, 2012 (JP) .................................. 2012-100801

(51) Int. Cl.
*A63F 13/26* (2014.01)
*A63F 13/843* (2014.01)

(52) U.S. Cl.
CPC ............. *A63F 13/26* (2014.09); *A63F 13/843* (2014.09); *A63F 2300/301* (2013.01)

(58) Field of Classification Search
CPC .. A63F 13/26; A63F 2300/301; A63F 13/25; A63F 2300/30
See application file for complete search history.

(56) References Cited

U.S. PATENT DOCUMENTS

| | | | | |
|---|---|---|---|---|
| 5,040,067 A | * | 8/1991 | Yamazaki | 348/588 |
| 6,540,614 B1 | * | 4/2003 | Nishino et al. | 463/40 |
| 8,929,721 B2 | * | 1/2015 | Cottrell | 386/278 |
| 2002/0165028 A1 | * | 11/2002 | Miyamoto et al. | 463/46 |
| 2003/0216177 A1 | * | 11/2003 | Aonuma et al. | 463/32 |
| 2004/0201544 A1 | * | 10/2004 | Love et al. | 345/1.1 |
| 2005/0164789 A1 | * | 7/2005 | Nakamura et al. | 463/36 |
| 2008/0215981 A1 | * | 9/2008 | York et al. | 715/720 |
| 2010/0255910 A1 | * | 10/2010 | Miyamoto et al. | 463/31 |
| 2010/0257450 A1 | * | 10/2010 | Go | G06F 3/0481 715/733 |
| 2012/0028700 A1 | * | 2/2012 | Avent et al. | 463/23 |
| 2012/0309523 A1 | * | 12/2012 | Yamashita | 463/31 |

FOREIGN PATENT DOCUMENTS

JP 8-215430 8/1996
JP 4473688 3/2010

* cited by examiner

*Primary Examiner* — Jay Liddle
(74) *Attorney, Agent, or Firm* — Nixon & Vanderhye PC (57) ABSTRACT

An example game system causes an image, based on an operation performed on a terminal apparatus including a display section, to be displayed on a stationary display apparatus separate from the terminal apparatus, and also causes an image based on an operation performed on a controller to be displayed on the display apparatus. Further, in the game system, an image based on the operation performed on the terminal apparatus is displayed on the display section of the terminal apparatus. In this case, when displayed on the stationary display apparatus, the image based on the operation performed on the controller is displayed so as to be larger than the image based on the operation performed on the terminal apparatus.

25 Claims, 10 Drawing Sheets

GAME SYSTEM, GAME PROCESSING METHOD, COMPUTER-READABLE STORAGE MEDIUM HAVING STORED THEREIN GAME PROGRAM, AND GAME APPARATUS

CROSS REFERENCE TO RELATED APPLICATION

The disclosure of Japanese Patent Application No. 2012-100801, filed on Apr. 26, 2012, is incorporated herein by reference.

FIELD

The technique disclosed herein relates to a game system, a game processing method, and a game apparatus that execute a game performed by a plurality of players, and a computer-readable storage medium having stored therein a game program that executes a game performed by a plurality of players.

BACKGROUND AND SUMMARY

Conventionally, there is a game apparatus that executes a game performed by two or more players. For example, there is a game where images for respective players are displayed in a plurality of areas into which a screen of a display apparatus is divided, so that each player operates a corresponding player object.

In a conventional game performed by a plurality of players, however, there is room for improvement in making images displayed on a display apparatus easy for the respective players to view.

Therefore, it is an object of an exemplary embodiment to provide a game system, a game processing method, a game program, and a game apparatus that are capable of, in a game performed by a plurality of players, displaying images that are easy for the respective players to view.

To achieve the above object, the exemplary embodiment employs the following configurations.

An exemplary embodiment is a game system for a plurality of players to perform a game using a first operation apparatus and a second operation apparatus, the first operation apparatus including a first display apparatus. The game system includes a game processing unit, a first display control unit, and a second display control unit. The game processing unit performs game processing based on operations performed on the first operation apparatus and the second operation apparatus. The first display control unit, on the basis of the game processing, causes a first image based on the operation performed on the first operation apparatus to be displayed on the first display apparatus. The second display control unit, on the basis of the game processing, causes a second image based on the operation performed on the first operation apparatus to be displayed on a second display apparatus, and also causes a third image based on the operation performed on the second operation apparatus to be displayed on the second display apparatus, the second display apparatus being separate from the first display apparatus. Further, the second display control unit causes the second image and the third image to be displayed on the second display apparatus such that the third image is larger than the second image.

It should be noted that the second image displayed on the second display apparatus may be the same image as the first image displayed on the first display apparatus, or may be a different image (an image viewed from a different viewpoint, an image having different information added thereto, or the like).

On the basis of the above, in accordance with an operation performed on a first operation apparatus including a first display apparatus, an image is displayed on the first display apparatus, and an image based on the operation performed on the first operation apparatus is displayed also on a second display apparatus. On the second display apparatus, an image based on an operation performed on a second operation apparatus is displayed so as to be larger than the image based on the operation performed on the first operation apparatus. This makes it easy for a second player operating the second operation apparatus to view the image based on their own operation. Further, the second player can understand the operation of a first player operating the first operation apparatus, by viewing the corresponding image on the second display apparatus.

In addition, in another configuration, the second display control unit may cause the second image and the third image to be displayed on the second display apparatus such that a sum of horizontal lengths of the second image and the third image is greater than a horizontal length of a screen of the second display apparatus, and a sum of vertical lengths of the second image and the third image is greater than a vertical length of the screen of the second display apparatus.

On the basis of the above, it is possible to make the sum of the vertical sizes, and the sum of the horizontal sizes, of a second image and a third image greater than the vertical and horizontal sizes of a screen, which makes it possible to display the second image and the third image so as to be larger. Further, the third image is larger than the second image, and therefore results in an image that is easier for the second player operating the second operation apparatus to view.

In addition, in another configuration, the second display control unit may cause the second image and the third image to be displayed on the second display apparatus such that a corner portion of the second image and a corner portion of the third image overlap each other.

On the basis of the above, the second image and the third image are displayed so as to overlap each other at their corner portions. This makes it possible to display the images so as to be larger, and also display, for example, central portions of the images, which are more important in a game.

In addition, in another configuration, in an overlapping region of the second image and the third image, the second display control unit may cause a part of one of the second and third images to be displayed in a part of the overlapping region, and may cause a part of the other image in the remaining part of the overlapping region.

On the basis of the above, it is possible to, in the overlapping region of the two images, display the images in their respective areas.

In addition, in another configuration, an aspect ratio of each of the second image and the third image may be the same as an aspect ratio of a screen of the second display apparatus.

On the basis of the above, it is possible to match the aspect ratio of each image with the aspect ratio of a screen.

In addition, in another configuration, the game system may allow the game to be performed by one player using the first operation apparatus. The second display control unit, when the game is performed by one player, causes an image based on the operation performed on the first operation apparatus to be displayed on the second display apparatus. Further, the second display control unit causes the image to be displayed on the second display apparatus such that an aspect ratio of the image displayed on the second display apparatus when the game is performed by the one player is the same as an aspect ratio of each of the second image and the third image displayed when the game is performed by the plurality of players.

On the basis of the above, it is possible to match the aspect ratio of an image displayed on the second display apparatus when one player plays, with the aspect ratio of each image displayed on the second display apparatus when a plurality of players play.

In addition, in another configuration, the game system may allow the game to be performed further using a third operation apparatus. Further, the second display control unit further causes a fourth image based on an operation performed on the third operation apparatus to be displayed on the second display apparatus so as to be larger than the second image.

On the basis of the above, three players can play a game, and it is possible to display, on the second display apparatus, two images based on operations performed on the second operation apparatus and a third operation apparatus, so as to be larger than the image based on the operation performed on the first operation apparatus.

In addition, in another configuration, the second display control unit may cause the third image and the fourth image to be displayed on the second display apparatus such that a sum of horizontal lengths of the third image and the fourth image is greater than a horizontal length of a screen of the second display apparatus, and a sum of vertical lengths of the third image and the fourth image is greater than a vertical length of the screen of the second display apparatus, while the second display control unit may also cause the second image to be displayed in an area other than areas where the third image and the fourth image are displayed.

On the basis of the above, when three players play the game, it is possible to display on the second display apparatus the two images based on the operations performed on the second and third operation apparatuses, so as to be larger.

In addition, in another configuration, the game system may allow the game to be performed by four players using third and fourth operation apparatuses in addition to the first operation apparatus and the second operation apparatus. The second display control unit, when the game is performed by four players, causes images based on operations performed on the first through fourth operation apparatuses to be displayed on the second display apparatus, all the images having the same aspect ratio. Further, the second display control unit causes the images to be displayed on the second display apparatus such that the aspect ratio of each image displayed on the second display apparatus when the game is performed by the four players is the same as an aspect ratio of each of the second image and the third image.

On the basis of the above, four players can play a game, and it is possible to match the aspect ratio of each of a second image and a third image, with the aspect ratio of each image displayed on the second display apparatus when four players play the game.

In addition, in another configuration, the second display control unit may cause information shared among the plurality of players to be displayed in an area of the second display apparatus other than areas where both images are displayed.

On the basis of the above, it is possible to display information shared among a plurality of players, in an area other than the display areas of the respective images.

In addition, in another configuration, the first image displayed on the first display apparatus may include an image not displayed in the second image displayed on the second display apparatus.

On the basis of the above, it is possible to display on the first display apparatus an image not displayed on the second display apparatus.

In addition, another embodiment is a game system for a plurality of players to perform a game using a first operation apparatus and a second operation apparatus. The game system includes a game processing unit and a display control unit. The game processing unit performs game processing based on operations performed on the first operation apparatus and the second operation apparatus. The display control unit, on the basis of the game processing, causes a first image based on the operation performed on the first operation apparatus to be displayed on a display apparatus, and also causes a second image based on the operation performed on the second operation apparatus to be displayed on the display apparatus. Further, the display control unit causes the first image and the second image to be displayed on the display apparatus such that a sum of horizontal lengths of the first image and the second image is greater than a horizontal length of a screen of the display apparatus, and a sum of vertical lengths of the first image and the second image is greater than a vertical length of the screen of the display apparatus.

On the basis of the above, it is possible to make a third image larger than a second image, which makes the third image easier for a second player operating a second operation apparatus to view.

It should be noted that another embodiment may be a game processing method performed by the game system. Further, another embodiment may be a game program and a game apparatus that are capable of performing the above processing. It should be noted that the game system may be achieved by the cooperation of a plurality of apparatuses, or may be achieved by one apparatus.

The exemplary embodiment makes it possible to, in a game performed by a plurality of players, make images displayed on a display apparatus easy for the respective players to view.

These and other objects, features, aspects and advantages of the exemplary embodiment will become more apparent from the following detailed description of the exemplary embodiment when taken in conjunction with the accompanying drawings.

DETAILED DESCRIPTION OF NON-LIMITING EXAMPLE EMBODIMENTS (Example of Configuration of Game System)

Figure 1:
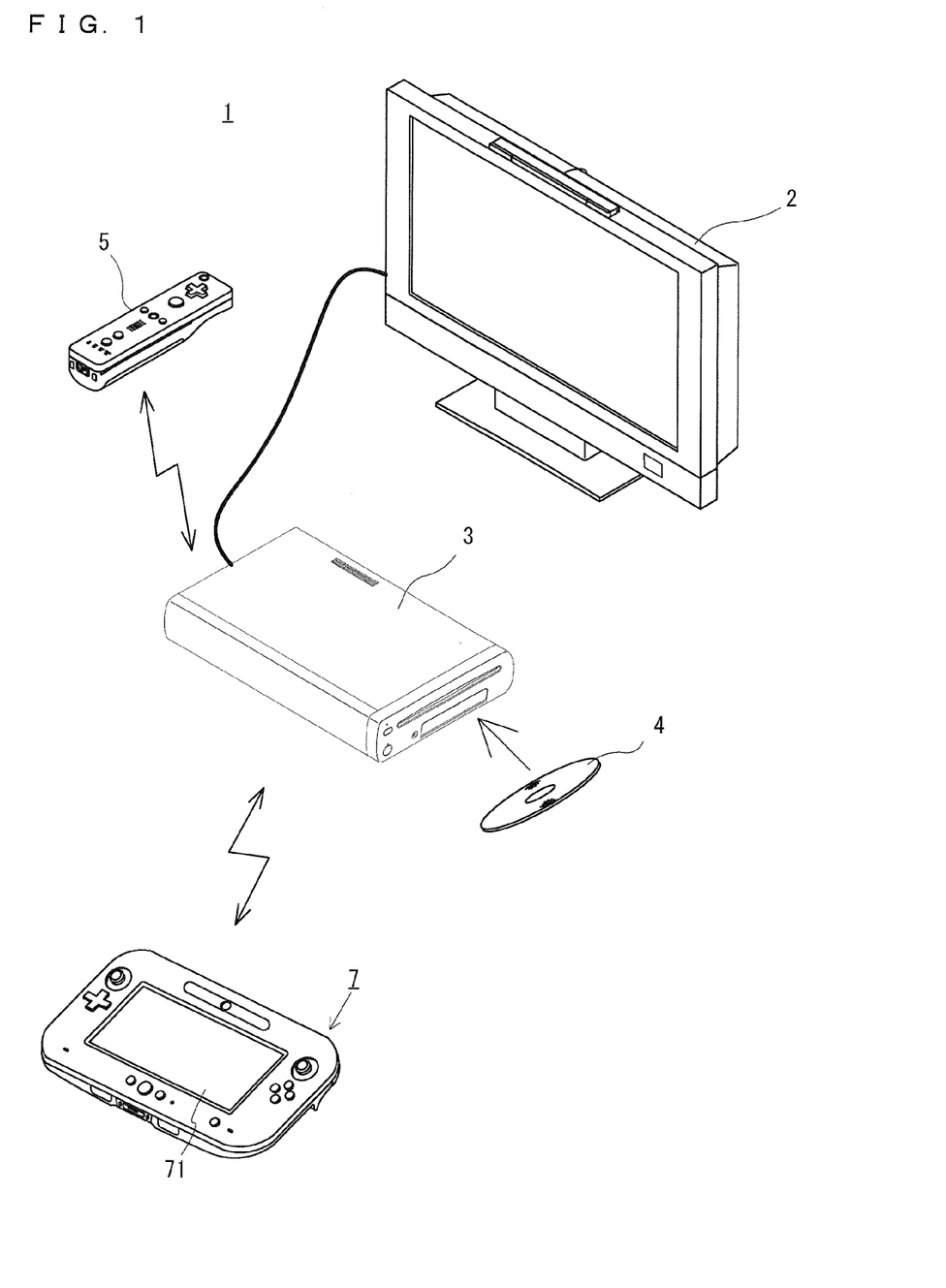
FIG. 1 is an external view of a non-limiting example of the configuration of a game system 1.
Figure 2:
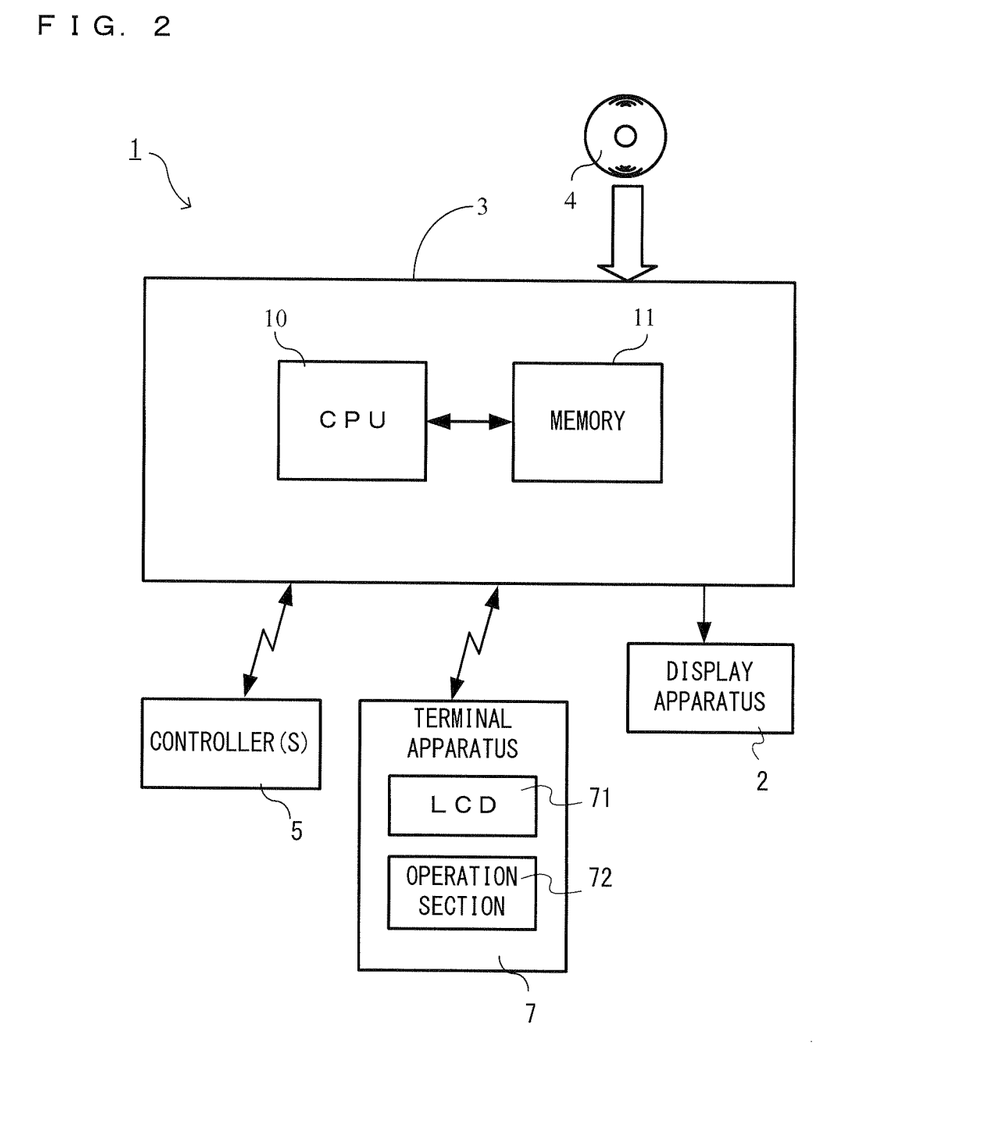
FIG. 2 is a block diagram showing a non-limiting example of the configuration of the game system 1.

With reference to the drawings, a game system 1 according to an exemplary embodiment is described below. FIG. 1 is an external view of an example of the configuration of the game system 1. FIG. 2 is a block diagram showing an example of the configuration of the game system 1. As shown in FIGS. 1 and 2, the game system 1 includes a stationary display apparatus (referred to as a "television") 2 such as a television receiver, a stationary game apparatus 3, an optical disk 4, a controller 5, and a terminal apparatus 7.

The game apparatus 3 includes a CPU 10, a memory 11, and the like. A program stored in a storage medium such as the optical disk 4 is loaded into the memory 11. The CPU 10 executes the program loaded into the memory, thereby performing processing described later. Then, the game apparatus 3 generates images resulting from the processing, and outputs the images to the television 2 and the terminal apparatus 7.

The terminal apparatus 7 is a portable display apparatus of such a size that a user can hold it with one hand or both hands. The terminal apparatus 7 is operated by a first user. The first user can use the terminal apparatus 7 by moving it while holding it, or by placing it at any position. The terminal apparatus 7 includes an LCD (Liquid Crystal Display) 71, which is a display apparatus, and an operation section 72 such as buttons and analog sticks for a game operation. The terminal apparatus 7 and the game apparatus 3 can communicate with each other using wireless communication. The terminal apparatus 7 receives, from the game apparatus 3, data of an image generated by the game apparatus 3, and displays the image on the LCD 71. Further, the terminal apparatus 7 transmits, to the game apparatus 3, operation data based on the operation performed on the terminal apparatus 7 (the operation performed on the operation section 72 or the like).

The controller 5 is of such a size that a user can hold it. The controller 5 is operated by a second user. The controller 5 includes an input section for a game operation.

It should be noted that the game system 1 shown in FIGS. 1 and 2 is merely illustrative, and the processing described later may be performed by any apparatus.

(Overview of Game Processing)

Next, a description is given of an overview of the game processing performed by the game system 1 according to the exemplary embodiment. A game according to the exemplary embodiment is performed by a plurality of players. In the game according to the exemplary embodiment, for example, one terminal apparatus 7 and one controller 5 are connected to the game apparatus 3 using wireless communication, so that two players can play the game. Further, three players (or four players) can play the game using one terminal apparatus 7 and two (or three) controllers 5, or one player can play the game using one terminal apparatus 7.

Figure 3:
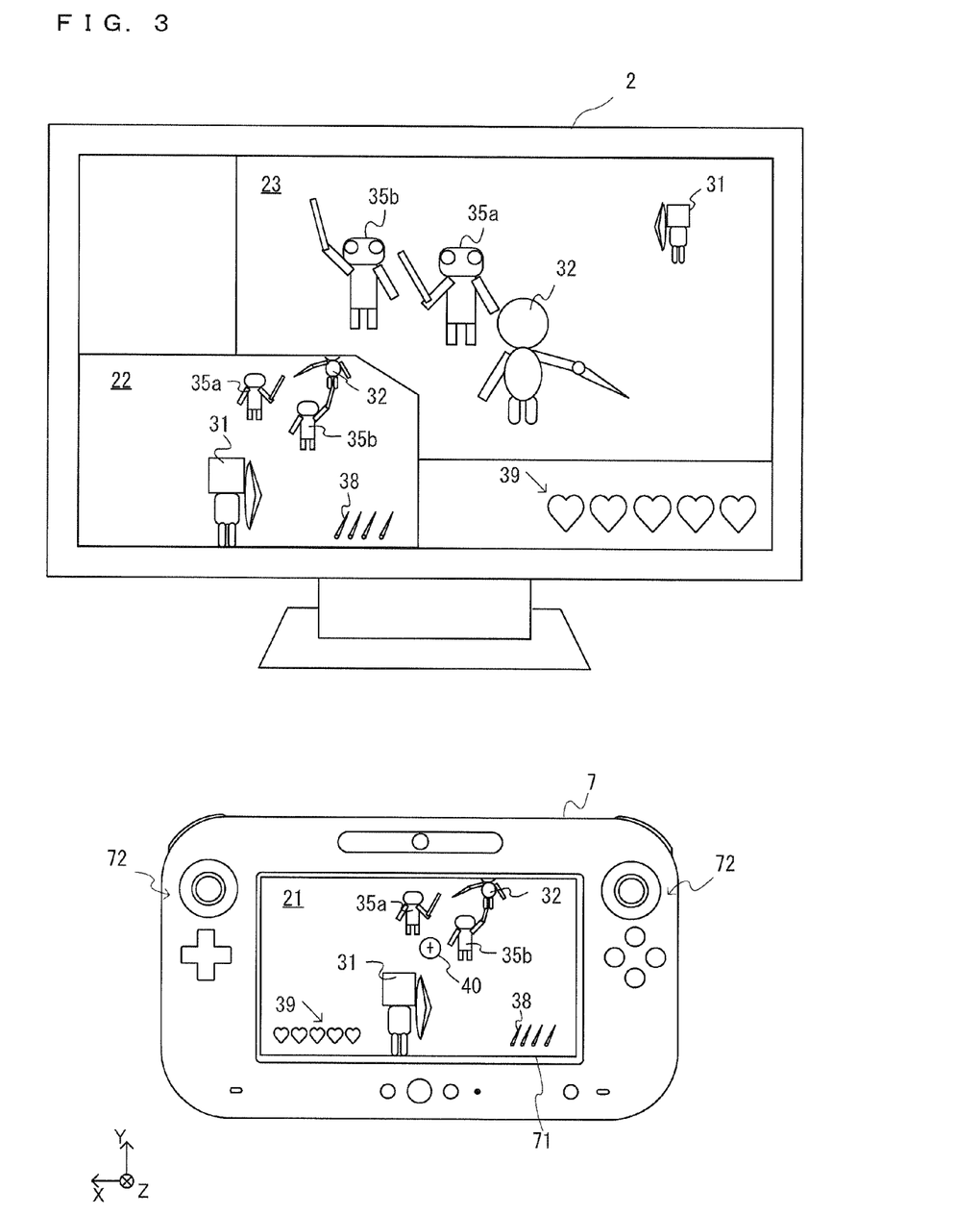
FIG. 3 is a diagram showing non-limiting examples of images displayed on an LCD 71 of a terminal apparatus 7 and a television 2 when a game is performed by two players.

FIG. 3 is a diagram showing examples of images displayed on the LCD 71 of the terminal apparatus 7 and the television 2 when the game is performed by two players. The case is described below where a first player operates the terminal apparatus 7, and a second player operates a controller 5a.

As shown in FIG. 3, when the game is performed by two players, an image 22 and an image 23 are displayed on the television 2. The image 22 includes a player character 31 controlled by the first player. Further, in FIG. 3, the image 22 also includes an enemy character 35a and an enemy character 35b controlled by the game apparatus 3, and a player character 32 controlled by the second player. Further, the image 22 shows the number of remaining arrow objects 38 used by the player character 31 to attack the enemy characters 35. Meanwhile, the image 23 includes the player character 32 controlled by the second player. In FIG. 3, the image 23 also includes the enemy character 35a and the enemy character 35b, and the player character 31.

The image 22 is one that changes in accordance with the operation performed on the terminal apparatus 7, and the image 23 is one that changes in accordance with the operation performed on the controller 5a. Specifically, the image 22 is one in which a game space is viewed from a first virtual camera set behind the player character 31, and the image 23 is one in which the game space is viewed from a second virtual camera set behind the player character 32.

For example, the image 22 changes in accordance with the operation performed on the operation section 72 of the terminal apparatus 7, or changes in accordance with a change in the orientation of the terminal apparatus 7. Further, the image 23 changes in accordance with the operation performed on the input section of the controller 5a, or changes in accordance with a change in the orientation of the controller 5a. It is possible to calculate the orientations of the terminal apparatus 7 and the controller 5 using, for example, the values detected by an inertial sensor (an acceleration sensor, an angular velocity sensor, or the like) included in each of the terminal apparatus 7 and the controller 5.

In addition, as shown in FIG. 3, on the LCD 71 of the terminal apparatus 7, an image 21 (a terminal image) is displayed in which the game space is viewed from the first virtual camera set behind the player character 31. In the image 21, an aim 40 as well as the objects displayed in the image 22 is displayed. The first player places the aim 40 on any one of the enemy characters 35 while viewing the image 21, and performs the operation of making an attack, using the operation section 72, thereby launching an arrow object 38. The first player thus makes an attack on the enemy characters 35.

Meanwhile, the second player operates the controller 5a while viewing the image 23 on the television 2, thereby causing the player character 32 to swing a sword object. The second player thus makes an attack on the enemy characters 35. The second player can know the situation of the first player by viewing the image 22 on the television 2, and the first player can know the situation of the second player by viewing the image 23 on the television 2. The first player and the second player enjoy the game by thus cooperating to defeat the enemy characters 35. In the game according to the exemplary embodiment, all the player characters share lives 39, so that, if the player character 31 and the player character 32 are attacked by the enemy characters 35 and the lives 39 become 0, the players lose.

As shown in FIG. 3, the image 23 based on the operation performed on the controller 5a is larger than the image 22 based on the operation performed on the terminal apparatus 7. That is, the first player basically plays the game while viewing the screen of the terminal apparatus 7, and therefore, the image 22 displayed on the television 2 is displayed so as to be relatively small. On the other hand, the second player plays the game while viewing the television 2, and therefore, the image 23 based on the operation performed on the controller 5a is displayed so as to be relatively large.

Figure 4:
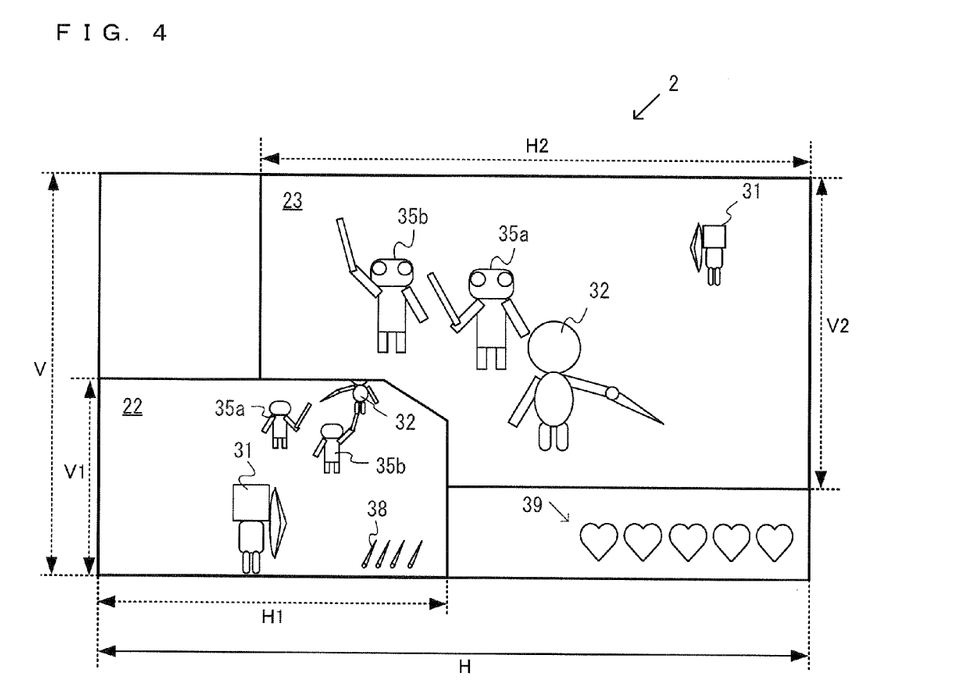
FIG. 4 is a diagram illustrating non-limiting examples of the sizes of an image 22 and an image 23 displayed on the television 2.

FIG. 4 is a diagram illustrating the sizes of the image 22 and the image 23 displayed on the television 2. As shown in FIG. 4, the aspect ratio (the ratio of the horizontal to vertical size) of each of the image 22 and the image 23 is equal to the aspect ratio of the screen of the television 2. That is, the horizontal size of the screen of the television 2 is H, and the vertical size of the screen of the television 2 is V; the horizontal size of the image 22 is H1, and the vertical size of the image 22 is V1; the horizontal size of the image 23 is H2, and the vertical size of the image 23 is V2. In this case, the ratio of H1 to V1 is equal to the ratio of H to V, and the ratio of H2 to V2 is equal to the ratio of H to V.

In addition, the sum of H1 and H2 is greater than H, and the sum of V1 and V2 is greater than V. Thus, as shown in FIG. 4, when the two images are displayed on the television 2, display is performed such that a part of the image 22 and a part of the image 23 overlap each other. More specifically, display is performed such that a corner portion of the image 22 and a corner portion of the image 23 overlap each other. In the overlapping region of the two images, a part of the image 22 is displayed in a part of the overlapping region, and a part of the image 23 is displayed in the remaining part of the overlapping region. For example, as shown in FIG. 4, in the overlapping region of the two images, a corner portion of the image 22 is cut, and a part of the image 23 is displayed in the overlapping region of the cut portion.

Figure 5:
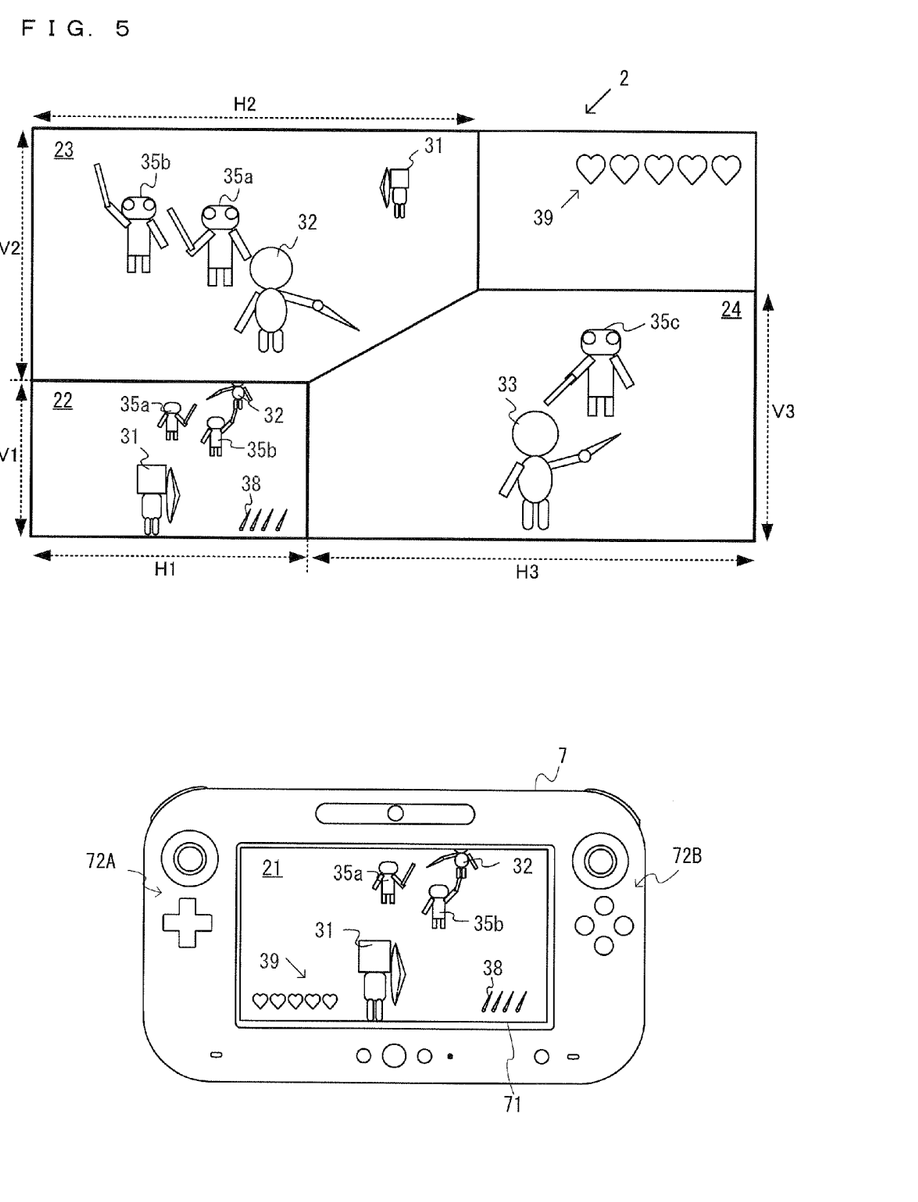
FIG. 5 is a diagram showing non-limiting examples of images displayed on the LCD 71 of the terminal apparatus 7 and the television 2 when the game is performed by three players.

Next, the case is described where the game is performed by three players. FIG. 5 is a diagram showing examples of images displayed on the LCD 71 of the terminal apparatus 7 and the television 2 when the game is performed by three players. As shown in FIG. 5, on the television 2, an image 24 as well as the image 22 and the image 23 is displayed. The image 24 is one that changes in accordance with the operation performed on a controller 5b by a third player. The image 24 is one in which the game space is viewed from a virtual camera set behind a player character 33 controlled by the third player.

As shown in FIG. 5, the image 23 and the image 24 are displayed on the screen of the television 2 so as to overlap each other at their corner portions. The aspect ratio of each of the image 23 and the image 24 is equal to the aspect ratio of the screen. Specifically, the horizontal size H2 of the image 23 is equal to a horizontal size H3 of the image 24, and the sum of H2 and H3 is greater than the horizontal size H of the screen. Further, the vertical size V2 of the image 23 is equal to a vertical size V3 of the image 24, and the sum of V2 and V3 is greater than the vertical size V of the screen.

Further, in an area of the screen of the television 2 other than the areas where the image 23 and the image 24 are displayed, the image 22 based on the operation performed on the terminal apparatus 7 is displayed.

Similarly to the two-person play, the image 23 and the image 24 based on the operations performed on the controllers 5a and 5b, respectively, are larger than the image 22 based on the operation performed on the terminal apparatus 7, and the aspect ratio of each of the image 23 and the image 24 is equal to the aspect ratio of the screen of the television 2. Thus, the image 22 is made smaller, while the image 23 and the image 24 are arranged so as to overlap each other at their corner portions. This makes it possible to maintain the aspect ratio of each image while securing relatively large display areas for the image 23 and the image 24. For example, if three images are displayed while maintaining the aspect ratio of each image, the screen may be divide into four equal areas so that the images are displayed in the corresponding divided areas. In this case, the vertical and horizontal sizes of each of the image 23 and the image 24 are the same as those of the image 22, which makes the image 23 and the image 24 smaller. This results in images that are difficult for the second player and the third player to view, the second and third players playing while viewing the television 2. In the exemplary embodiment, however, as shown in FIG. 5, the screen is divided so that the image 23 and the image 24 are relatively large. This results in images that are easy for the second player and the third player to view. Meanwhile, the first player can basically play the game while viewing the screen of the terminal apparatus 7, and therefore has no problem playing the game even if the image 22 of the television 2 is displayed so as to be relatively small.

Figure 6:
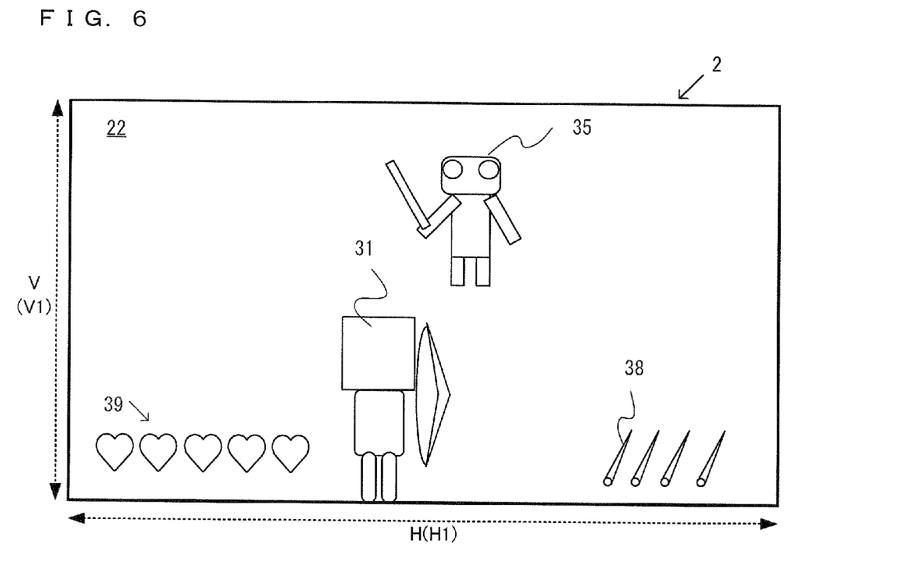
FIG. 6 is a diagram showing a non-limiting example of an image displayed on the television 2 when the game is performed by one player.
Figure 7:
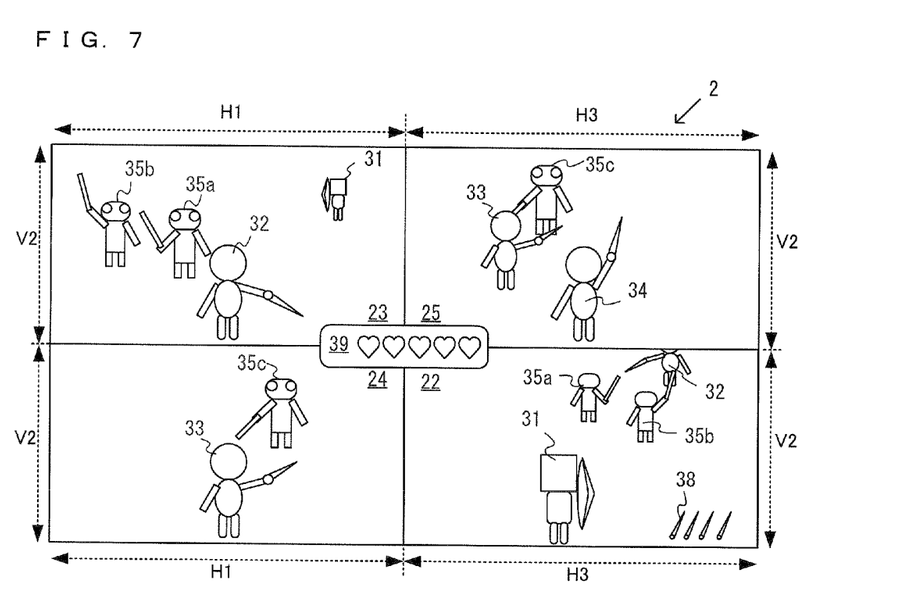
FIG. 7 is a diagram showing non-limiting examples of images displayed on the television 2 when the game is performed by four players.

It should be noted that, when the game according to the exemplary embodiment is performed by one player, an image shown in FIG. 6 is displayed on the television 2. When the game is performed by four players, images shown in FIG. 7 are displayed on the television 2. FIG. 6 is a diagram showing an example of an image displayed on the television 2 when the game is performed by one player. FIG. 7 is a diagram showing examples of images displayed on the television 2 when the game is performed by four players.

As shown in FIG. 6, when the game is performed by one player using the terminal apparatus 7, the image 22 based on the operation performed on the terminal apparatus 7 is displayed on the entire screen of the television 2. Further, although not shown in the figures, the image 21 that is the same as the image 22 is displayed also on the LCD 71 of the terminal apparatus 7. In this case, the aspect ratio of the image 22 is equal to the aspect ratio of the screen.

In addition, as shown in FIG. 7, when the game is performed by four players, the screen of the television 2 is divide into four equal areas, so that the image 22, the image 23, the image 24, and an image 25 based on the operation performed on a controller 5c operated by a fourth player are displayed in the respective divided areas. The aspect ratio of each image on the television 2 is equal to the aspect ratio of the screen.

As described above, in the game of two-person play using one terminal apparatus 7 and one controller 5, the image 21 based on the operation performed on the terminal apparatus 7 is displayed on the terminal apparatus 7, and the image 22 based on the operation performed on the terminal apparatus 7 and the image 23 based on the operation performed on the controller 5 are displayed on the television 2. The image 23 is larger than the image 22, and therefore results in an image that is easy for the second player to view, the second player playing while viewing the image 23. Specifically, the image 22 and the image 23 are displayed with the same aspect ratio as that of the screen, and the image 22 and the image 23 are displayed so as to overlap each other at their corner portions. This makes it possible to secure a larger display area for the image 23.

Here, if two images are displayed on one screen, each image may be displayed in, for example, the corresponding one of two equal left and right areas, or two equal upper and lower areas, into which the screen is divided. In this case, to display each image in the corresponding one of the two equally divided areas, it is necessary to change the ratio of the horizontal to vertical size of the image by cutting both ends of the image in the left-right direction or the up-down direction, or enlarging or reducing the image in the horizontal direction or the vertical direction. This may result in an image that is difficult for the player to view. Thus, it is necessary to adjust the operability of the game and the level of difficulty of the game in accordance with a change in the field of view. In the exemplary embodiment, however, the aspect ratio of each of the image 22 and the image 23 is equal to the aspect ratio of the screen, and the image 22 and the image 23 are displayed so as to overlap each other at their corner portions. This makes it possible to maintain the aspect ratio of each image, while displaying the image 23 so as to be larger, which results in an image that is easy for the second player to view. Further, the field of view does not change, and therefore, it is not necessary to adjust the operability of the game and the level of difficulty of the game.

In addition, in the game of three-person play using one terminal apparatus 7 and two controllers 5, the image 21 based on the operation performed on the terminal apparatus 7 is displayed on the terminal apparatus 7. Further, the image 22 based on the operation performed on the terminal apparatus 7 is displayed on the television 2, while the image 23 and the image 24 based on the operations performed on the respective controllers 5 are also displayed on the television 2. In the game of three-person play, the image 23 and the image 24 are displayed so as to be larger than the image 22. Further, the aspect ratio of each of the image 22, the image 23, and the image 24 is equal to the aspect ratio of the screen of the television 2 (equal to the aspect ratio of the image in one-person play or each image in four-person play), and the image 23 and the image 24 are displayed on the television 2 so as to overlap each other at their corner portions. Thus, also in the game of three-person play, it is possible to maintain the aspect ratio of each image while securing larger display areas for the image 23 and the image 24, which results in images that are easy for the second player and the third player to view.

In addition, as shown in FIGS. 3 and 5, the lives 39 are displayed in an empty area other than the areas where the images for the respective players are displayed. The lives 39 are information to be shared among all the players. Such information is displayed in an empty area of the screen, which makes it possible to maximize the sizes of the images for the respective players, and also allow all the players to share the information.

(Variations)

It should be noted that the above embodiment is merely illustrative, and, for example, may be modified in various manners as described below.

Figure 8:
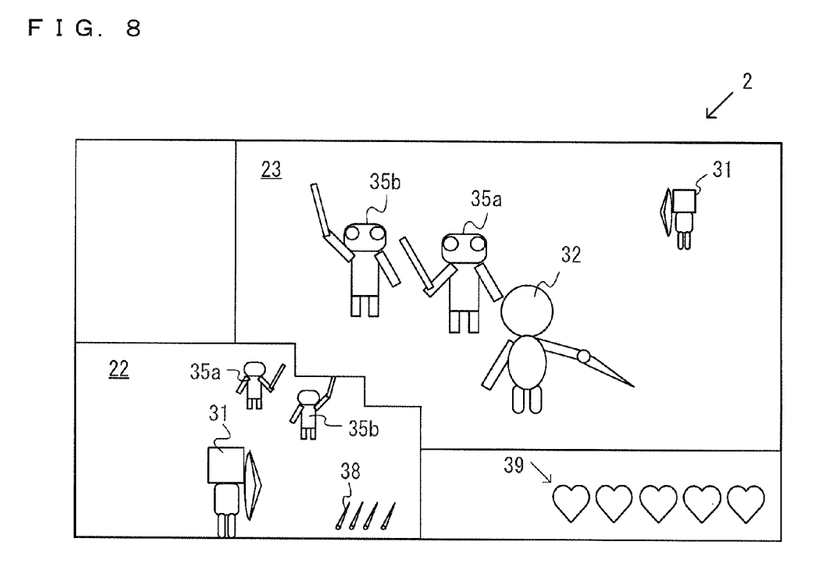
FIG. 8 is a diagram showing non-limiting examples of images displayed on the television 2 when the game is performed by two players in another embodiment.

For example, in the above embodiment, two images are displayed on the television 2 by diagonally cutting corner portions of the two images. Alternatively, in another embodiment, as shown in FIG. 8, corner portions of the two images may be cut in a stepped manner. FIG. 8 is a diagram showing examples of images displayed on the television 2 when the game is performed by two players in another embodiment. As shown in FIG. 8, the image 23 is larger than the image 22, and the aspect ratio of each of the image 22 and the image 23 is equal to the aspect ratio of the screen. Further, the sum of the vertical lengths of both images is greater than the vertical length of the screen, and the sum of the horizontal lengths of both images is greater than the horizontal length of the screen. Further, the image 22 and the image 23 overlap each other at their corner portions, and a part of the overlapping region is cut in a stepped manner.

Figure 9:
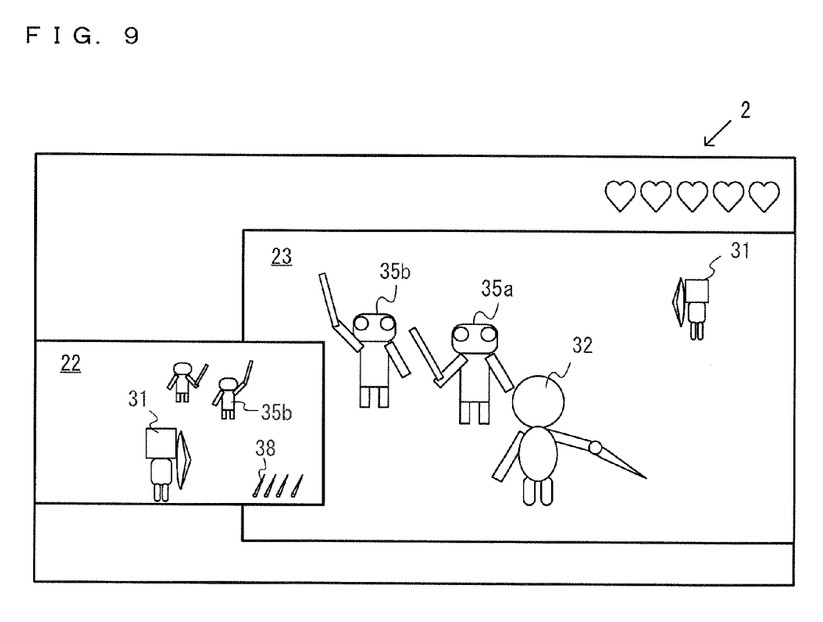
FIG. 9 is a diagram showing non-limiting examples of images displayed on the television 2 when the game is performed by two players in another embodiment.

Alternatively, in another embodiment, the two images may not need to overlap each other at their corner portions, but, as shown in FIG. 9, a part of the image 22 may overlap a part of the image 23 at a part of one of the short sides (or the long sides) of the image 23. FIG. 9 is a diagram showing examples of images displayed on the television 2 when the game is performed by two players in another embodiment. Also in FIG. 9, the image 23 is larger than the image 22, and the aspect ratio of each image is equal to the aspect ratio of the screen. Further, the sum of the vertical lengths of both images is greater than the vertical length of the screen, and the sum of the horizontal lengths of both images is greater than the horizontal length of the screen.

In addition, in the above embodiment, the image 21 displayed on the terminal apparatus 7 and the image 22 displayed on the television 2 are images generated using the same virtual camera. Alternatively, in another embodiment, an image displayed on the terminal apparatus 7 (an image that changes in accordance with the operation performed on the terminal apparatus 7) and an image displayed on the television 2 (an image that changes in accordance with the operation performed on the terminal apparatus 7) may be images generated using different virtual cameras. In addition, in the above embodiment, images generated using the same virtual camera are displayed on the terminal apparatus 7 and the television 2; however, an image not included in the image 22 displayed on the television 2 is displayed in the image 21 displayed on the terminal apparatus 7 (the lives 39 shown in FIG. 3 are displayed in the image 21 on the terminal apparatus 7 but are not displayed in the image 22 on the television 2). Alternatively, in another embodiment, these two images may be exactly the same image.

In addition, in the above embodiment, the game is performed by a plurality of players using the terminal apparatus 7 and the controller 5. An image is displayed on the LCD 71 in accordance with the operation performed on the terminal apparatus 7, and the image 22, which is similar to the image displayed on the LCD 71, is displayed also on the television 2. Alternatively, in another embodiment, the image 22 based on the operation performed on the terminal apparatus 7 does not necessarily need to be displayed on the television 2. Yet alternatively, the game may be performed by a plurality of players using a plurality of controllers 5 without using the terminal apparatus 7, and images for the respective players may be displayed on the television 2.

Figure 10:
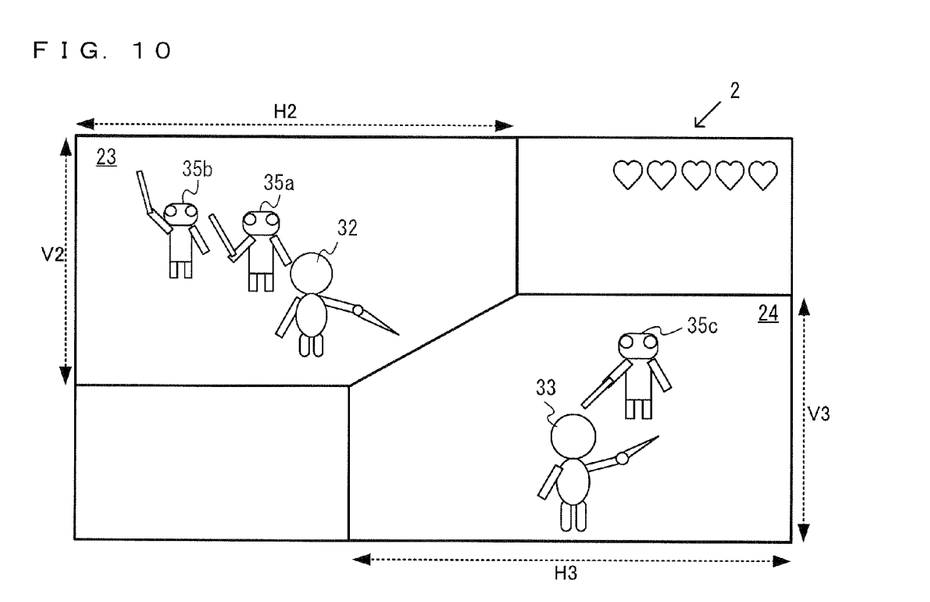
FIG. 10 is a diagram showing non-limiting examples of images displayed on the television 2 when the game is performed using two controllers 5 in another embodiment.

FIG. 10 is a diagram showing examples of images displayed on the television 2 when the game is performed using two controllers 5 in another embodiment. In FIG. 10, the image 23 is one based on the operation performed on the controller 5a, and the image 24 is one based on the operation performed on the controller 5b. The game shown in FIG. 10 is where one of the players operates the player character 32 using the controller 5a, and the other player operates the player character 33 using the controller 5b, so that the players cooperate to defeat the enemy characters 35 in the game space. The image 22 and the image 23 have the same size, and the ratio of the horizontal to vertical size (H2/V2) of the image 22 and the ratio of the horizontal to vertical size (H3/V3) of the image 23 are each equal to the ratio of the horizontal to vertical size of the screen. Further, the image 22 and the image 23 are displayed so as to overlap each other at their corner portions. Specifically, the sum of the horizontal size H2 of the image 22 and the horizontal size H3 of the image 23 is greater than the horizontal size H of the screen, and the sum of the vertical size V2 of the image 22 and the vertical size V3 of the image 23 is greater than the vertical size V of the screen. This makes it possible to maintain the ratio of the horizontal to vertical size of each of the two images, while displaying the two images so as to be larger.

In addition, in the above embodiment, two images are displayed on the television 2 so as to overlap each other such that a part of one of the two images is displayed in a part of the overlapping region, and a part of the other image is displayed in the remaining part of the overlapping region (for example, the two images are displayed by diagonally cutting corner portions of the two images, or by cutting corner portions of the two images in a stepped manner). Alternatively, in another embodiment, only a part of one of the two images may be displayed in the overlapping region, or the two images may be displayed so as to be semitransparent in the overlapping region. Alternatively, in another embodiment, in the overlapping region of the two images, one of the two images may change over time so as to be displayed with priority over the other image (the boundary between the two images may change over time).

Figure 11:
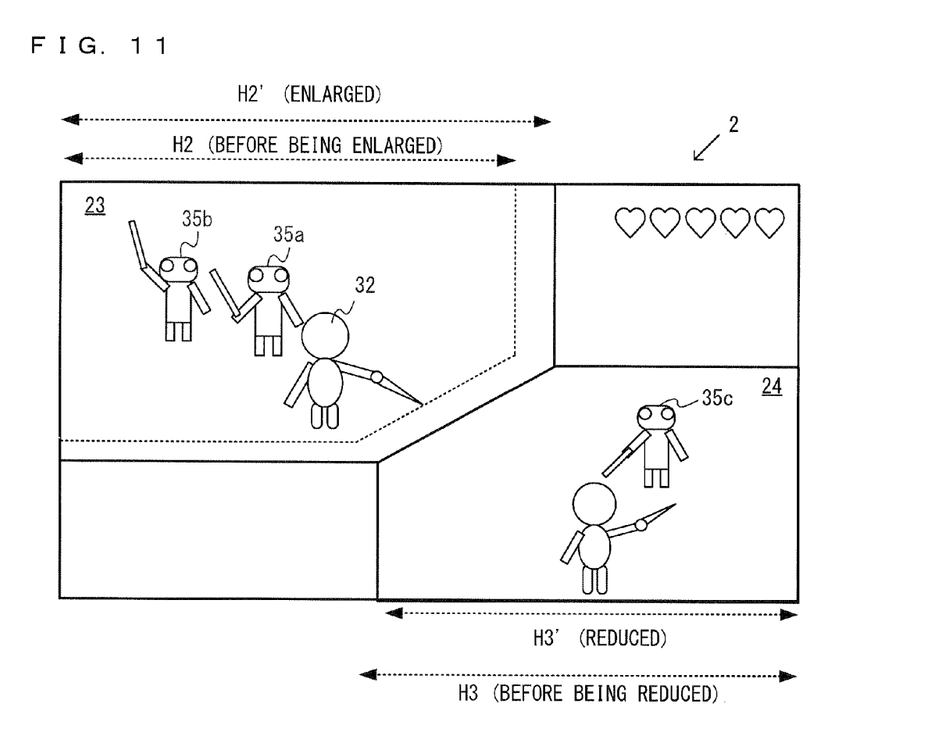
FIG. 11 is a diagram showing a non-limiting example of the state where the sizes of images displayed on the television 2 change in another embodiment.

Alternatively, in another embodiment, the size of each image displayed on the television 2 may be enlarged or reduced in accordance with the situation of the game. FIG. 11 is a diagram showing the state where the size of each image displayed on the television 2 changes in another embodiment. For example, each image may become larger or smaller in accordance with the degree of success of the corresponding player (for example, a parameter whose value increases with an increase in the number of the enemy characters 35 the player defeats).

In addition, in the exemplary embodiment, the game progresses with the cooperation of a plurality of players. Alternatively, in another embodiment, the game may be where a plurality of players compete against each other. Further, the game may be any type of game so long as it is performed by a plurality of players.

(Flow of Processing)

Figure 12:
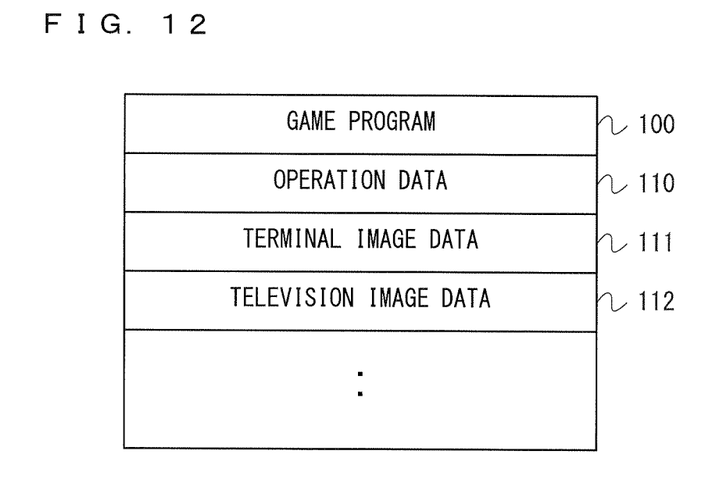
FIG. 12 is a diagram showing a non-limiting example of various data stored in a game apparatus 3.

Next, a description is given of the flow of the game processing performed by the game system 1 according to the exemplary embodiment. First, a description is given of various data stored in a memory. FIG. 12 is a diagram showing various data stored in the game apparatus 3.

As shown in FIG. 12, the memory 11 of the game apparatus 3 or the like stores: a game program 100 for performing the processing described later; operation data 110 representing the operations performed on the terminal apparatus 7 and the controllers 5; terminal image data 111 representing a terminal image displayed on the LCD 71 of the terminal apparatus 7; television image data 112 representing a television image displayed on the television 2; and the like. The television image is an image including images generated by virtual cameras set behind the respective player characters. The memory also stores data representing the position and the orientation of each character in the game space, image data of each character, and the like, as well as the above.

(Description of Flow Chart)

Figure 13:
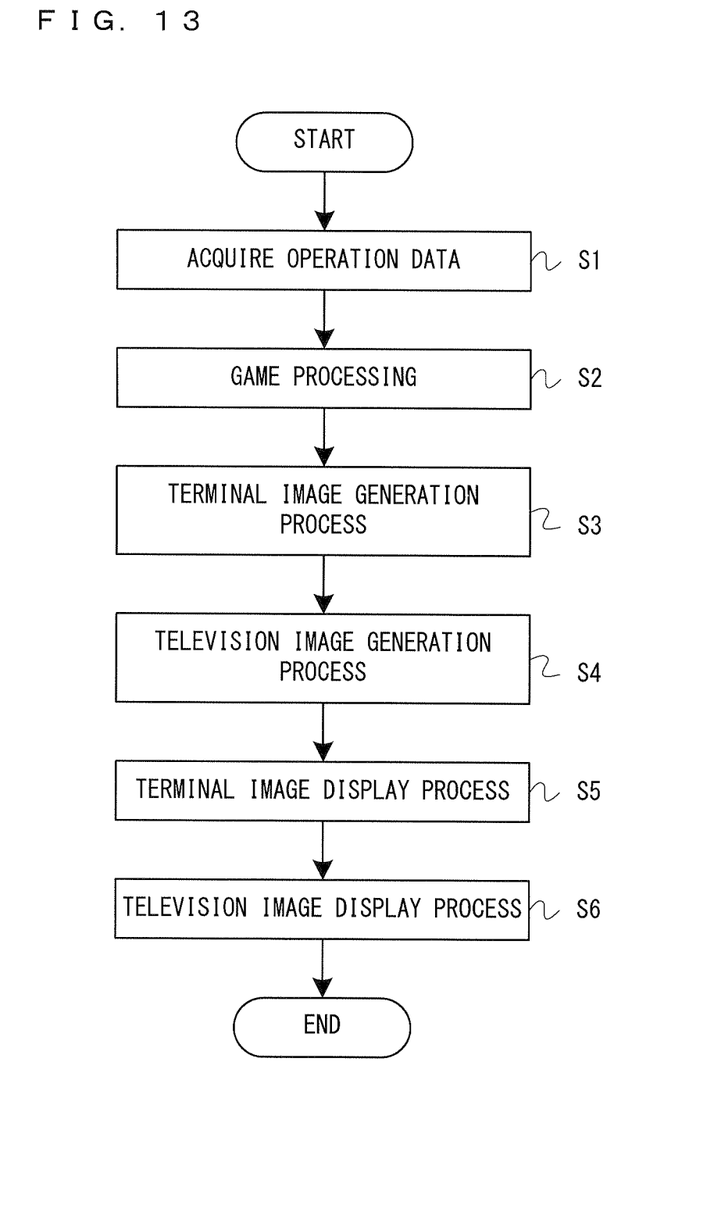
FIG. 13 is a main flow chart showing a non-limiting example of the flow of the processing performed by the game apparatus 3.

Next, with reference to FIG. 13, a description is given of details of the processing performed by the game apparatus 3 (the CPU 10). FIG. 13 is a main flow chart showing the flow of the processing performed by the game apparatus 3. It should be noted that the case is described below where three players play the game.

First, the game apparatus 3 acquires, from the terminal apparatus 7 and the controllers 5 (5a, 5b), operation data representing the operations performed on the terminal apparatus 7 and the controllers 5 (step S1). Next, the game apparatus 3 performs game processing on the basis of the acquired operation data (step S2). In the game processing, for example, the game apparatus 3 causes the player character 31 to move in the game space on the basis of the operation data from the terminal apparatus 7, causes the player characters 32 and 33 to move in the game space on the basis of the operation data from the controllers 5, and causes these characters to take attacking actions.

Next, the game apparatus 3 performs the process of generating a terminal image (step S3). Here, the game apparatus 3 generates an image in which the game space is captured by the first virtual camera set behind the player character 31, and superimposes images of the lives 39 and the arrow objects 38 on the generated image, thereby generating a terminal image (the image 21).

Next, the game apparatus 3 performs the process of generating a television image (step S4). Here, the game apparatus 3 generates images (the image 22, the image 23, and the image 24) in which the game space is captured by the respective virtual cameras set behind the player character 31, the player character 32, and the player character 33, and arranges the generated images as shown in FIG. 5, thereby generating one television image.

Next, the game apparatus 3 transmits the terminal image generated in step S3 to the terminal apparatus 7, thereby performing a terminal image display process for displaying the terminal image on the LCD 71 of the terminal apparatus 7 (step S5). Then, the game apparatus 3 performs a television image display process (step S6). Here, the game apparatus 3 outputs the television image generated in step S4 to the television 2. This is the end of the processing.

It should be noted that the processing of the flow chart shown in FIG. 13 is repeatedly performed. Further, the processes of all the steps in the flow chart are merely illustrative, and therefore, the processing order of the steps may be changed.

In addition, some of the processing described above may be performed by the terminal apparatus 7. For example, the image 21 displayed on the terminal apparatus 7 may be generated by the terminal apparatus 7.

In addition, the program may be executed not only by the game apparatus 3 described above, but also by any other information processing apparatus, and the other information processing apparatus may function as the game system described above. Possible examples of the other information processing apparatus include mobile phones, smartphones, PDAs, personal computers, tablet computers, and the like. The other information processing apparatus may function as the game apparatus 3 and/or the terminal apparatus 7 described above.

Alternatively, in another embodiment, in a game system including a plurality of apparatuses capable of communicating with each other, the plurality of apparatuses may share the execution of the game processing performed by the game apparatus 3 as described above. For example, the game system as described above may include a plurality of information processing apparatuses connected to a network such as the Internet.

In addition, in the above embodiment, the processing indicated in the flow chart described above is performed as a result of the CPU of the game apparatus 3 executing the program. Alternatively, in another embodiment, some or all of the processing described above may be performed by a dedicated circuit included in the game apparatus 3, or may be performed by a general-purpose processor other than the dedicated circuit. At least one processor may operate as a "programmed logic circuit" for performing the processing described above.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above. The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art. Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system for performing a game using a first operation apparatus and a second operation apparatus, the first operation apparatus including a first display apparatus, the game system comprising a processor system including at least one processor, and the processor system being configured to at least:
    perform game processing based on operations performed on the first operation apparatus and the second operation apparatus; and
    on the basis of the game processing, cause a first image based on the operation performed on the first operation apparatus to be displayed on the first display apparatus,
    cause a second image based on the operation performed on the first operation apparatus to be displayed on a second display apparatus, and
    cause a third image based on the operation performed on the second operation apparatus to be displayed on the second display apparatus, the second display apparatus being separate from the first display apparatus, the third image being larger than the second image, the second image partially overlapping with the third image, wherein in a region where the second and third images overlap, a corner portion of the second image is removed, and a part of the third image removed corner portion of the second image.

2. The game system according to claim 1, wherein the second image and the third image are caused to be displayed on the second display apparatus such that a sum of horizontal lengths of the second image and the third image is greater than a horizontal length of a screen of the second display apparatus, and a sum of vertical lengths of the second image and the third image is greater than a vertical length of the screen of the second display apparatus.

3. The game system according to claim 2, wherein the second image and the third image are caused to be displayed on the second display apparatus such that a corner portion of the second image and a corner portion of the third image overlap.

4. The game system according to claim 2, wherein in the overlapping region of the second image and the third image, a part of one of the second and third images is caused to be displayed in a part of the overlapping region, and a part of the other one of the second and third images is caused to be displayed in the remaining part of the overlapping region.

5. The game system according to claim 1, wherein an aspect ratio of each of the second image and the third image is the same as an aspect ratio of a screen of the second display apparatus.

6. The game system according to claim 1, wherein the game system allows the game to be performed further using a third operation apparatus, and
the processor system is further configured to cause a fourth image based on an operation performed on the third operation apparatus to be displayed on the second display apparatus so as to be larger than the second image.

7. The game system according to claim 6, wherein the processor system is further configured to cause the third image and the fourth image to be displayed on the second display apparatus such that a sum of horizontal lengths of the third image and the fourth image is greater than a horizontal length of a screen of the second display apparatus, and a sum of vertical lengths of the third image and the fourth image is greater than a vertical length of the screen of the second display apparatus, and also cause the second image to be displayed in an area other than areas where the third image and the fourth image are displayed.

8. The game system according to claim 1, wherein the game system allows the game to be performed by four players using third and fourth operation apparatuses in addition to the first operation apparatus and the second operation apparatus, and
the processor system is further configured to
    when the game is performed by four players, cause images based on operations performed on the first through fourth operation apparatuses to be displayed on the second display apparatus, all the images having the same aspect ratio, and cause the images to be displayed on the second display apparatus such that the aspect ratio of each image displayed on the second display apparatus when the game is performed by the four players is the same as an aspect ratio of each of the second image and the third image.

9. The game system according to claim 1, wherein the processor system is further configured to cause information shared among more than one player to be displayed in an area of the second display apparatus other than areas where both the second and third images are displayed.

10. The game system according to claim 1, wherein the first image displayed on the first display apparatus includes an image not displayed in the second image displayed on the second display apparatus.

11. The game system according to claim 1, wherein the corner portion of the second image is removed diagonally.

12. The game system according to claim 1, wherein the corner portion of the second image is removed in a stepped manner.

13. A game processing method performed by a game system for a plurality of players to perform a game using a first operation apparatus and a second operation apparatus, the first operation apparatus including a first display apparatus, the game processing method comprising:
performing game processing based on operations performed on the first operation apparatus and the second operation apparatus;
on the basis of the game processing, causing a first image based on the operation performed on the first operation apparatus to be displayed on the first display apparatus; and
on the basis of the game processing, causing a second image based on the operation performed on the first operation apparatus to be displayed on a second display apparatus, and also causing a third image based on the operation performed on the second operation apparatus to be displayed on the second display apparatus, the second display apparatus being separate from the first display apparatus, the second image and the third image being caused to be displayed on the second display apparatus such that the third image is larger than the second image,
wherein the second image partially overlaps with the third image, and in a region where the second and third images overlap, a corner portion of the second image is removed, and a part of the third image is displayed in at least a part of the removed corner portion of the second image.

14. The game processing method according to claim 13, wherein the corner portion of the second image is removed diagonally.

15. The game processing method according to claim 13, wherein the corner portion of the second image is removed in a stepped manner.

16. A non-transitory computer-readable storage medium having stored therein a game program to be executed by a computer of an apparatus for a plurality of players to perform a game using a first operation apparatus and a second operation apparatus, the first operation apparatus including a first display apparatus, the game program causing the computer to execute:
performing game processing based on operations performed on the first operation apparatus and the second operation apparatus;
on the basis of the game processing, causing a first image based on the operation performed on the first operation apparatus to be displayed on the first display apparatus; and
on the basis of the game processing, causing a second image based on the operation performed on the first operation apparatus to be displayed on a second display apparatus, and also causing a third image based on the operation performed on the second operation apparatus to be displayed on the second display apparatus, the second display apparatus being separate from the first display apparatus, the second image and the third image being caused to be displayed on the second display apparatus such that the third image is larger than the second image,
wherein the second image partially overlaps with the third image, and in a region where the second and third images overlap, a corner portion of the second image is removed, and a part of the third image is displayed in at least a part of the removed corner portion of the second image.

17. The non-transitory computer-readable storage medium according to claim 16, wherein the corner portion of the second image is removed diagonally.

18. The non-transitory computer-readable storage medium according to claim 16, wherein the corner portion of the second image is removed in a stepped manner.

19. A game apparatus for a plurality of players to perform a game using a first operation apparatus and a second operation apparatus, the first operation apparatus including a first display apparatus, the game apparatus comprising:
a game processor configured to perform game processing based on operations performed on the first operation apparatus and the second operation apparatus;
a first display controller configured to, on the basis of the game processing, cause a first image based on the operation performed on the first operation apparatus to be displayed on the first display apparatus; and
a second display controller configured to, on the basis of the game processing, cause a second image based on the operation performed on the first operation apparatus to be displayed on a second display apparatus, and also cause a third image based on the operation performed on the second operation apparatus to be displayed on the second display apparatus, the second display apparatus being separate from the first display apparatus,
the second display controller causing the second image and the third image to be displayed on the second display apparatus such that the third image is larger than the second image,
wherein the second image partially overlaps with the third image, and in a region where the second and third images overlap, a corner portion of the second image is removed, and a part of the third image is displayed in at least a part of the removed corner portion of the second image.

20. The game apparatus according to claim 19, wherein the corner portion of the second image is removed diagonally.

21. The game apparatus according to claim 19, wherein the corner portion of the second image is removed in a stepped manner.

22. A game system for a plurality of players to perform a game using a first operation apparatus and a second operation apparatus, the game system comprising a processor system including at least one processor, and the processor system being configured to at least:

perform game processing based on operations performed on the first operation apparatus and the second operation apparatus; and on the basis of the game processing, cause a first image based on the operation performed on the first operation apparatus to be displayed on a display apparatus, cause a second image based on the operation performed on the second operation apparatus to be displayed on the display apparatus, and cause the first image and the second image to be displayed on the display apparatus such that a sum of horizontal lengths of the first image and the second image is greater than a horizontal length of a screen of the display apparatus, and a sum of vertical lengths of the first image and the second image is greater than a vertical length of the screen of the display apparatus, wherein the first image partially overlaps with the second image, and in a region where the second and third images overlap, a corner portion of the second image is removed, and a part of the third image is displayed in at least a part of the removed corner portion of the second image.

23. The game system according to claim 22, wherein an aspect ratio of each of the first image and the second image is the same as an aspect ratio of the screen of the display apparatus.

24. The game system according to claim 22, wherein the corner portion of the first image is removed diagonally.

25. The game system according to claim 22, wherein the corner portion of the first image is removed in a stepped manner.

* * * * *